July 16, 1940.  W. H. CHURCHILL  2,208,541

FASTENER MEMBER

Filed Dec. 23, 1937

Inventor:
Wilmer H. Churchill.
By Walter S. Jones Att'y.

Patented July 16, 1940

2,208,541

UNITED STATES PATENT OFFICE 2,208,541

FASTENER MEMBER

Wilmer H. Churchill, Saugus, Mass., assignor to United-Carr Fastener Corporation, Cambridge, Mass., a corporation of Massachusetts Application December 23, 1937, Serial No. 181,341

5 Claims. (Cl. 85—5)

This invention relates to improvements in snap fastener secured installations and snap fasteners for the same.

In the drawing, which illustrates a preferred embodiment of my invention:

The object of my invention is to provide a fastener member having staple-like attaching prongs at one end whereby it may be secured to a supporting structure and a rigid head at the other end shaped and arranged in a way to utilize the yieldability of portions of material of another part adjacent an opening therein so as to enter into snap fastener engagement with the other part through the opening.

Thus it will be seen that my fastener member, which is provided with a rigid head for fastener engagement with an article through an opening thereof may be made of soft metal so that the staple-like attaching prongs which I have chosen, in my preferred form, for securing the fastener member to a supporting means may function to carry out the attaching purpose in a most efficient manner, as will be understood by those skilled in the art. At the same time my fastener member, which is constructed in such a way that it may operate efficiently even though made of soft metal, is relatively simple and inexpensive to manufacture and otherwise adaptable to being made in large quantities.

Figure 1:
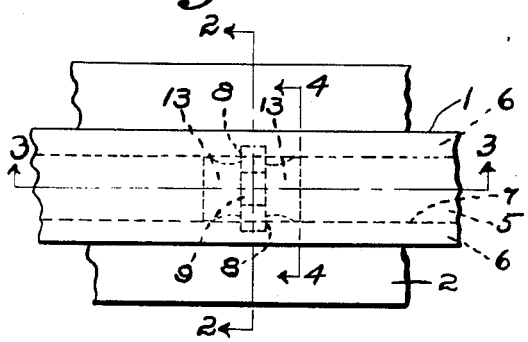
Figure 1 is a front view of my fastener installation with my improved fastener member shown in dotted lines.
Figure 2:
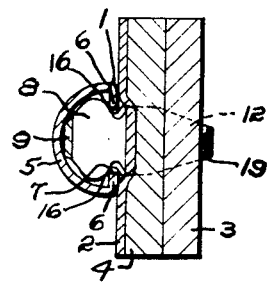
Fig. 2 is a section taken along the line 2—2 of Fig. 1.
Figure 3:
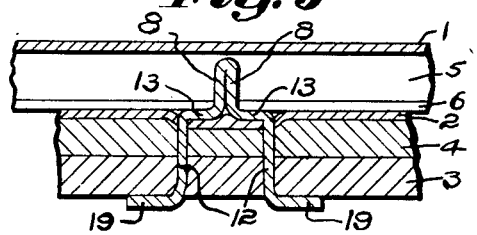
Fig. 3 is a section taken along the line 3—3 of Fig. 1.

Referring to my preferred installation illustrated in Figs. 1–3, the particular parts chosen to illustrate the use of my improved fastener include an article of manufacture, such as a molding strip 1, of the type now frequently used on the inside of automobiles and elsewhere and a supporting part which, in my preferred form, comprises covering material 2, which may be the inner upholstery of an automobile, a panel 3, which, in my preferred form, is of fibrous material, and padding 4 disposed between the panel and the covering material. It should be understood, however, that this is not the sole use of my improved fastener and that it may be used to fasten other parts together.

The molding strip 1 is preferably formed from thin metal and has a curved outer side 5 and inwardly-turned flange portions 6—6 adjacent opposite sides of an opening 7 running longitudinally of the strip. As a result of the relative thinness of the metal of the curved side 5, the sides of the strip adjacent opposite sides of the opening 7 yield outwardly when the flanges 6—6 are engaged by the rigid head of the fastener member and then spring back to engage securely the fastener head with the flanges in a manner to be described.

Figure 5:
Fig. 5 is a plan view of the blank of my fastener member.

Referring to my preferred fastener member per se, I have shown a simple and sturdy device of soft metal which may be formed from a blank similar to that shown in Fig. 5. My preferred blank shown in Fig. 5 comprises a pair of similarly shaped flat portions 8—8 which are joined together at the center of the blank by a connecting portion 9. Each of the flat portions 8—8 has a pair of camming edges 10—10 on opposite sides of the same and diverging from the connecting portion 9, and converging edges 11—11 adjacent the diverging edges. At opposite ends of the blank I have provided portions 12—12 which are preferably pointed at their free ends and adapted to form attaching prongs of the completed fastener. Portions 13—13 join each of the attaching prongs 12—12 with a respective flat portion 8 and are adapted to be bent outwardly in angular relation to a plane of the flat sides of the respective flat portion 8, in my completed fastener, as will be hereinafter described.

Figure 6:
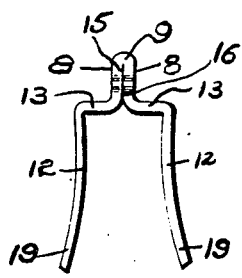
Fig. 6 is a side view of my completed fastener member per se.
Figure 7:
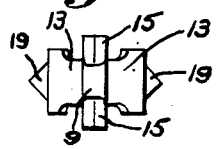
Fig. 7 is a top view of the fastener member shown in Fig. 6.

To form my completed fastener from a blank, such as shown in Fig. 5, I first form the head portion of the fastener by folding the blank substantially along the dotted line 14, which is preferably the transverse center line of the connecting portion 9, so as to bring inner flat faces of the flat portions 8—8 in substantially adjacent relationship, as most clearly shown in Fig. 6. As a result of the fact that the flat portions 8—8 are identical in size and shape, respective diverging edges 10—10 and converging edges 11—11 of the flat portions 8—8 align exactly one with another to form camming portions 15 and shoulders 16 an opposite sides of the head of the completed fastener. Next, the blank is bent along the dotted lines 17—17 forming outwardly-extending portions 13—13 on opposite sides of the head adjacent an opposite end thereof from the connecting portion 9. Finally, the blank is bent along the dotted lines 18—18 forming the attaching prongs 12—12 which extend downwardly in substantially perpendicular relation to the outwardly-extending portions 13—13. It will be noticed that the outermost free ends 19—19 of the prongs 12—12 are curved outwardly, in my preferred form, so as to enable the free ends to be curved back upon engaging an anvil (not shown) after passage through the supporting part whereby the fastener is secured to the support.

Figure 4:
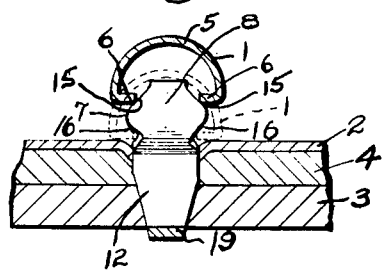
Fig. 4 is a sectional view taken along the line 4—4 of Fig. 1 and showing the method by which a molding strip is engaged with the fastener member.

Assembly of my improved fastener member with the parts of the installation is a relatively simple matter and is preferably carried out through first attaching the fastener member to the supporting part by a suitable automatic machine by forcing the prongs 12—12 through the covering 2, the backing 4 and the panel 3 whereupon the free ends 19—19 are curved back into engagement of the outer surface of the panel 3, as most clearly shown in Fig. 3, to affix rigidly the fastener to the support. Next, the molding 1 is moved toward the head of the fastener so that the flanges 6—6 engage the camming portions 15 of the head, as most clearly shown in Fig. 4. As downward pressure is exerted upon the molding 1, the sides of the strip 1 move away from each other as a result of the natural flexibility of the strip enabling the flanges 6—6 to be passed over the head portion whereupon the sides of the strip spring back to normal position so as to locate the flanges in final attached position behind the shoulders 16 whereby the strip 1 is finally disposed in the position illustrated in dotted lines in Fig. 4. Thus the parts of my installation are firmly secured together.

Although I have shown an installation having only one fastener member in assembly with the supporting part for securing the molding strip thereto, it should be understood that as many fasteners may be provided as are necessary for effecting a rigid attachment of the parts of the installation.

Although I have illustrated and described a preferred embodiment of my invention, I do not wish to be limited thereby because of the scope of my invention is best defined by the following claims.

I claim:

1. A fastener member having a head portion, said head portion comprising a pair of folded-together flat portions with the inner flat faces of said portions in adjacent relation, the narrow edges of said flat portions being aligned one with another and having diverging and converging portions providing shoulders for engaging another part through an aperture thereof, and attaching portions extending beneath said head for securing said fastener to another part.

2. A fastener member having a head portion, said head portion comprising a pair of flat portions with the inner flat faces of said portions in adjacent relation, the narrow edges of said flat portions being aligned one with another and having diverging and converging portions providing shoulders for engaging another part through an opening thereof, and attaching prongs extending beneath said head for securing said fastener to another part, said prongs having flat faces in substantially parallel relation to the flat faces of said flat portions.

3. A fastener member having a head portion, said head portion comprising a pair of flat portions with the inner flat faces of said portions in adjacent relation, the narrow edges of said flat portions being aligned one with another and having diverging and converging portions providing shoulders for engaging another part through an opening thereof, outwardly-extending portions on opposite sides of said head portion substantially adjacent one end thereof, and attaching means extending from said outwardly-extending portions for securing said fastener to another part.

4. A fastener member having a head portion for engaging another part through an opening thereof, said head portion comprising a pair of flat portions with the inner flat faces of said portions in adjacent relation, a connecting portion joining said flat portions at one end of said head, an outwardly-extending portion integral with each of said flat portions at an opposite end of said head from said connecting portion, the narrow edges of said flat portions intermediate the ends of said head being aligned one with another, and said aligned edges on opposite sides of said head between said ends having diverging and converging portions providing shoulders for engaging another part through an opening thereof, and attaching means extending from said outwardly-extending portions for securing said fastener to another part.

5. A fastener member having a head portion, said head portion comprising a pair of parallel flat portions with the inner flat faces of said portions disposed in facing relationship, the narrow edges of at least one of said flat portions diverging from one end to provide an entering wedge portion when being engaged with a cooperating part and converging providing shoulders for engaging the cooperating part through an aperture thereof, and attaching portions extending beneath said head for securing said fastener to a support.

WILMER H. CHURCHILL.